United States Patent [19]
Hiti et al.

[11] Patent Number: 6,163,128
[45] Date of Patent: Dec. 19, 2000

[54] METHOD AND DRIVE SYSTEM FOR CONTROLLING A PERMANENT MAGNET SYNCHRONOUS MACHINE

[75] Inventors: Silva Hiti, Torrance; Constantin C. Stancu, Anaheim; Dragan S. Maric, Claremont, all of Calif.

[73] Assignee: General Motors Corporation, Detroit, Mich.

[21] Appl. No.: 09/377,927

[22] Filed: Aug. 20, 1999

[51] Int. Cl.[7] .................................................. H02P 5/28
[52] U.S. Cl. ......................... 318/722; 318/802; 318/433
[58] Field of Search .................................. 318/432–434, 318/721, 812, 717–72, 802, 716, 805, 798, 799, 690, 723

[56] References Cited

U.S. PATENT DOCUMENTS

| | | | |
|---|---|---|---|
| 4,649,331 | 3/1987 | Jahns ........................................ | 318/798 |
| 4,724,373 | 2/1988 | Lipo ......................................... | 318/805 |
| 5,569,995 | 10/1996 | Kusaka et al. ............................ | 318/717 |
| 5,652,495 | 7/1997 | Narazaki et al. ......................... | 318/716 |
| 5,689,166 | 11/1997 | Nagayama et al. ...................... | 318/721 |
| 5,818,192 | 10/1998 | Nozari ...................................... | 318/609 |

OTHER PUBLICATIONS

Proceedings of the "1996 IEEE IECON" 22nd International Conference on Industrial Electronics, Control, and Instrumentation, vol. 2 of 3. (Jun., 1996).

"A Flux–Weakening Strategy for Current–Regulated Surface–Mounted Permanent–Magnet Machine Drives", IEEE Transactions on Energy Conversion, vol. 10, No. 3, Sep., 1995.

*Primary Examiner*—Robert E. Nappi
*Assistant Examiner*—Rita Leykin
*Attorney, Agent, or Firm*—Anthony Luke Simon

[57] ABSTRACT

A surface-mounted permanent magnet synchronous machine drive 10 and a method 30 of controlling the machine drive. Flux weakening and current regulating loops 70, 60 cooperate to provide automatic transition to the flux weakening mode (operation above base speed), regardless of DC bus voltage, load or other operating conditions. This feature provides significant performance improvement. No look-up tables are used in the flux weakening loop. The on-set point for flux weakening is automatically adjusted, and may be changed through software. An appropriate d-axis current component is injected over the entire speed range, providing the maximum available torque (which corresponds to the q-axis current component). The control method works with fixed frequency current compensators.

14 Claims, 2 Drawing Sheets

METHOD AND DRIVE SYSTEM FOR CONTROLLING A PERMANENT MAGNET SYNCHRONOUS MACHINE

BACKGROUND

The present invention relates generally to electric vehicles, and more particularly, to a system and method for controlling a surface-mounted permanent magnet synchronous machine drive used in electric vehicles over a wide speed range using a regulation error in the torque producing current component.

The assignee of the present invention designs and develops electric vehicles employing surface-mounted permanent magnet synchronous machine drives. One operation that is required when controlling such machine drives is flux weakening which is when the machine drive operates above base speed.

One straight-forward approach is to employ a number of look-up tables to resolve flux weakening operation. In order to achieve results and performance similar to those of the present invention, the straight-forward approach mentioned above requires creation of numerous and cumbersome data structures within the look-up tables to handle all possible situations in the system and its environment.

A method presented in a paper authored by S. D. Sudhoff, K. A. Corzine, and H. J. Hegner "A Flux-Weakening Strategy for Current-Regulated Surface-Mounted Permanent-Magnet Machine Drives", in IEEE Transactions on Energy Conversion, Vol. 10, No. 3, September 1995, pp.431–437 proposes a flux weakening strategy. The Sudhoff et al. approach requires usage of "bang-bang" (hysteresis) current regulators. This is not acceptable in automotive applications due to the varying switching frequency, and this way induced electromagnetic interference.

It would be desirable to have a method that does not rely on a cumbersome set of look-up tables, and wherein automatic transition is accomplished at all operating conditions. It would be desirable to have a method that does not require measurement of the DC bus voltage. It would be desirable to have a method which does not require usage of "bang-bang" current regulators.

It is therefore an objective to provide a system and method for controlling a surface mounted permanent magnet synchronous machine drive over a wide speed range using a regulation error in the torque producing current component. It is also an objective to provide a system and method for controlling a surface mounted permanent magnet synchronous machine drive used in electric vehicles.

SUMMARY OF THE INVENTION

The present invention comprises a permanent magnet synchronous machine drive and a method of controlling the machine drive. An exemplary surface-mounted permanent magnet synchronous machine drive comprises a motor, a voltage source inverter coupled between a battery and the motor that drives the motor, and a control system coupled to the inverter for controlling the inverter and the motor. The heart of the control system is a flux weakening circuit which functions to reduce the effective back emf reflected on a stator winding by injecting a negative current in the north rotor pole direction, and therefore weakening the rotor magnet effect on the stator winding voltage. In the invention, a feedback based flux-weakening strategy is used, which is independent of motor and system parameters.

An exemplary control system comprises a first coordinate transformation circuit for processing measured motor phase current signals ($i_a$, $i_b$) and rotor position signal ($\theta_r$) to generate motor current signals in the synchronous frame ($i_d$, $i_q$). A flux weakening circuit processes torque command ($T^{ref}$), and torque current error ($i_q^{ref}-i_q=i_{qerror}$) to generate d-axis and q-axis reference current signals ($i_d^{ref}$, $i_q^{ref}$) in response to q-axis current error signals. A current regulating loop processes the reference current signals ($i_d^{ref}$, $i_q^{ref}$) and the motor current signals ($i_d$, $i_q$) to generate d-axis and q-axis modulation index signals ($d_d$, $d_q$). A second coordinate transformation circuit transforms the d-axis and q-axis modulation index signals ($d_d$, $d_q$) into modulation index signals in the stationary coordinate frame ($d_\alpha$, $d_\beta$). A space vector modulator having a continuous transition into the six-step mode of inverter operation modulates the modulation index signals in the stationary coordinate frame signals ($d_\alpha$, $d_\beta$) to produce outputs that drive the voltage source inverter.

An exemplary method comprises the following steps. A torque command ($T^{ref}$) comprising a q-axis current reference signal ($i_q^{ref}$) is supplied. The q-axis current reference signal ($i_q^{ref}$) is limited. The q-axis current reference signal ($i_q^{ref}$) is compared with the q-axis motor current signal ($i_q$) to produce a q-axis current error signal ($i_{qerr}$). The q-axis current error signal is regulated to generate a q-axis modulation index signal ($d_q$). The q-axis current error signal is compared to a preset threshold value. If the q-axis current error signal is below the preset threshold value, the d-axis current reference ($i_d^{ref}$) is set equal to zero. If the q-axis current error signal is equal to or greater the preset threshold value, the d-axis current reference ($i_d^{ref}$) is set to a value that provides a voltage margin for production of q-axis current at a given motor speed. The d-axis current reference ($i_d^{ref}$) is compared with the d-axis motor current signal ($i_d$) to produce a d-axis current error signal. The d-axis current error signal ($i_{derr}$) is regulated to generate a d-axis modulation index signal ($d_d$).

The present invention automatically accomplishes the desired flux weakening transition at any operating conditions without relying on a complex system of look-up tables. The invention has advantages over approaches using "bang-bang" (hysteresis) current regulators because the present invention can be used with fixed frequency regulators, which more suitable for use in automotive applications because electromagnetic interference is easier to control.

Also, to ensure a much wider speed range in the flux weakening region, feedforward terms are used for the current control. The present invention may also be used for speed or position control, if desired.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
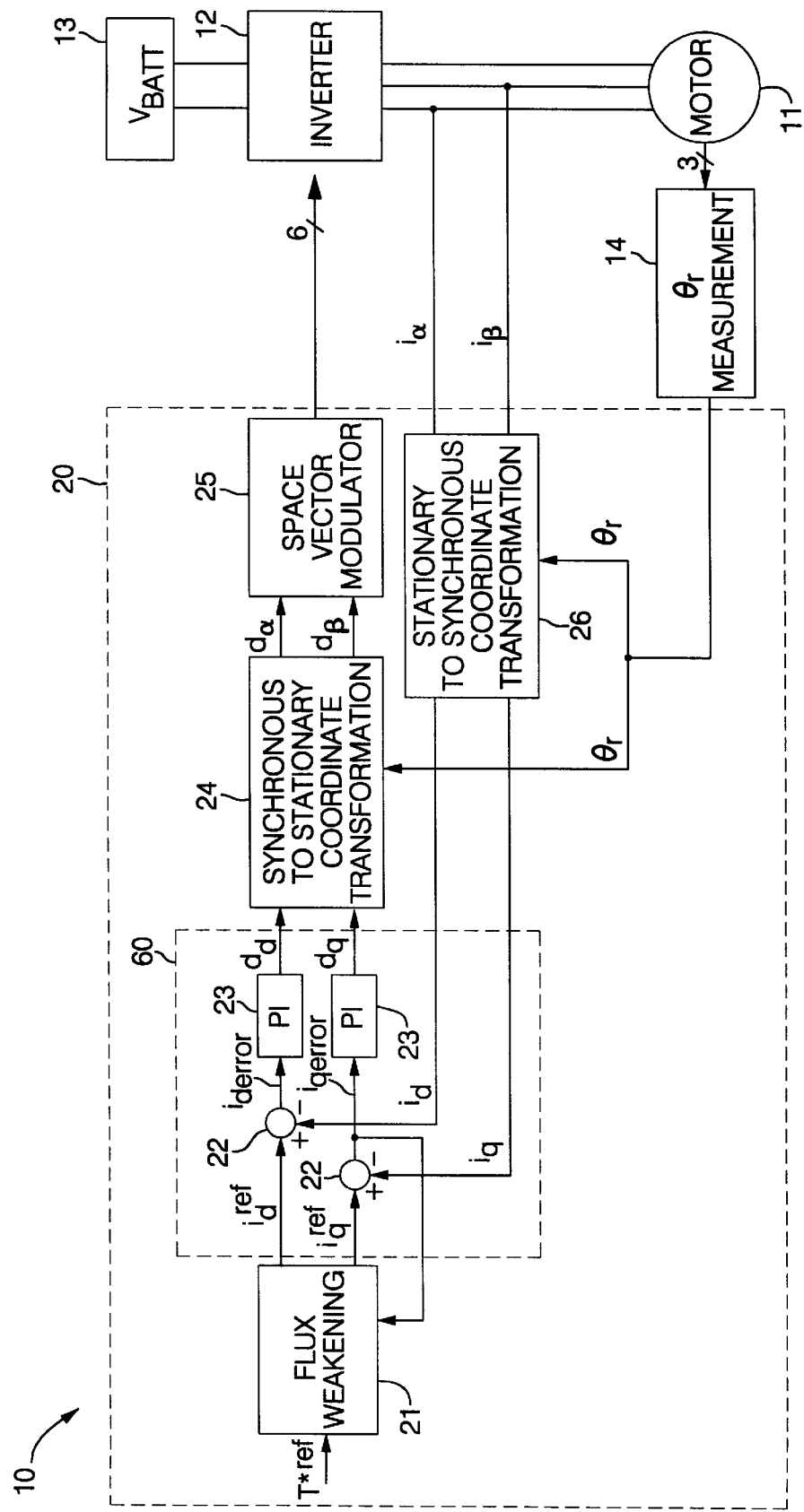
FIG. 1 illustrates a system block diagram of a surface-mounted permanent magnet synchronous machine drive employing an exemplary control system and method in accordance with the principles of the present invention.

Referring to the drawing figures, FIG. 1 illustrates a system block diagram of a surface-mounted permanent magnet synchronous machine drive 10 employing an exemplary control system 20 and method 30 in accordance with the principles of the present invention. The surface-mounted permanent magnet synchronous machine drive 10 comprises a motor 11 which is driven by a voltage source inverter 12 that is coupled to a battery 13 and controlled by the control system 20. The control system 20 may be implemented in the form of a digital signal processor (DSP), for example. Sensed rotor position ($\theta^r$) of the motor 11 is coupled by way of a measurement circuit 14 to the control system 20. The measurement circuit 14 may be either the type used with known rotor position sensors or the type that determines rotor position using a sensorless technique known to those skilled in the art.

The control system 20 comprises a flux weakening circuit 21 that has as its inputs a torque command ($T_{ref}$) and the q-axis (torque producing current) current error signal ($i_{qerr}$) derived as $i_q^{ref} - i_q = i_{qerr}$ (described in more detail with reference to FIG. 2). The measurement circuit 14 outputs the rotor position ($\theta_r$) of the motor 11 to a known synchronous to stationary coordinate transformation circuit 24, and to a known coordinate transform circuit 26 that processes motor phase current signals to produce measured current signals in the synchronous coordinate frame ($i_d$, $i_q$).

The flux weakening circuit 21 outputs reference magnetizing current $i_d^{ref}$, and reference torque producing current $i_q^{ref}$. The outputs of the flux weakening circuit 21 are coupled to first inputs of a current regulating loop 60. The current regulating loop 60 comprises an adder 22 and first and second proportional-integral (PI) regulators 23. The $i_d^{ref}$ is a first input to the adder 22. The adders 22 subtracts the measured current signal $i_d$, and $i_q$ from the reference current signals $i_d^{ref}$ and $i_q^{ref}$ forming the d-current error signal $i_{derr}$, and q-current error signal $i_{qerr}$.

The error signals are inputs to the proportional-integral (PI) regulators 23 that produce d-axis and q-axis modulation index signals ($d_d$, $d_q$). The d-axis and q-axis modulation index signals ($d_d$, $d_q$) are input to the synchronous to stationary coordinate transformation circuit 24 which transforms the d-axis and q-axis modulation index signals ($d_d$, $d_q$) to produce modulation index signals in the stationary coordinate frame ($d_\alpha$, $d_\beta$). The modulation index signals in the stationary coordinate frame ($d_\alpha$, $d_\beta$) are modulated by a known space vector modulator 25 to produce outputs that drive the voltage source inverter.

Figure 2:
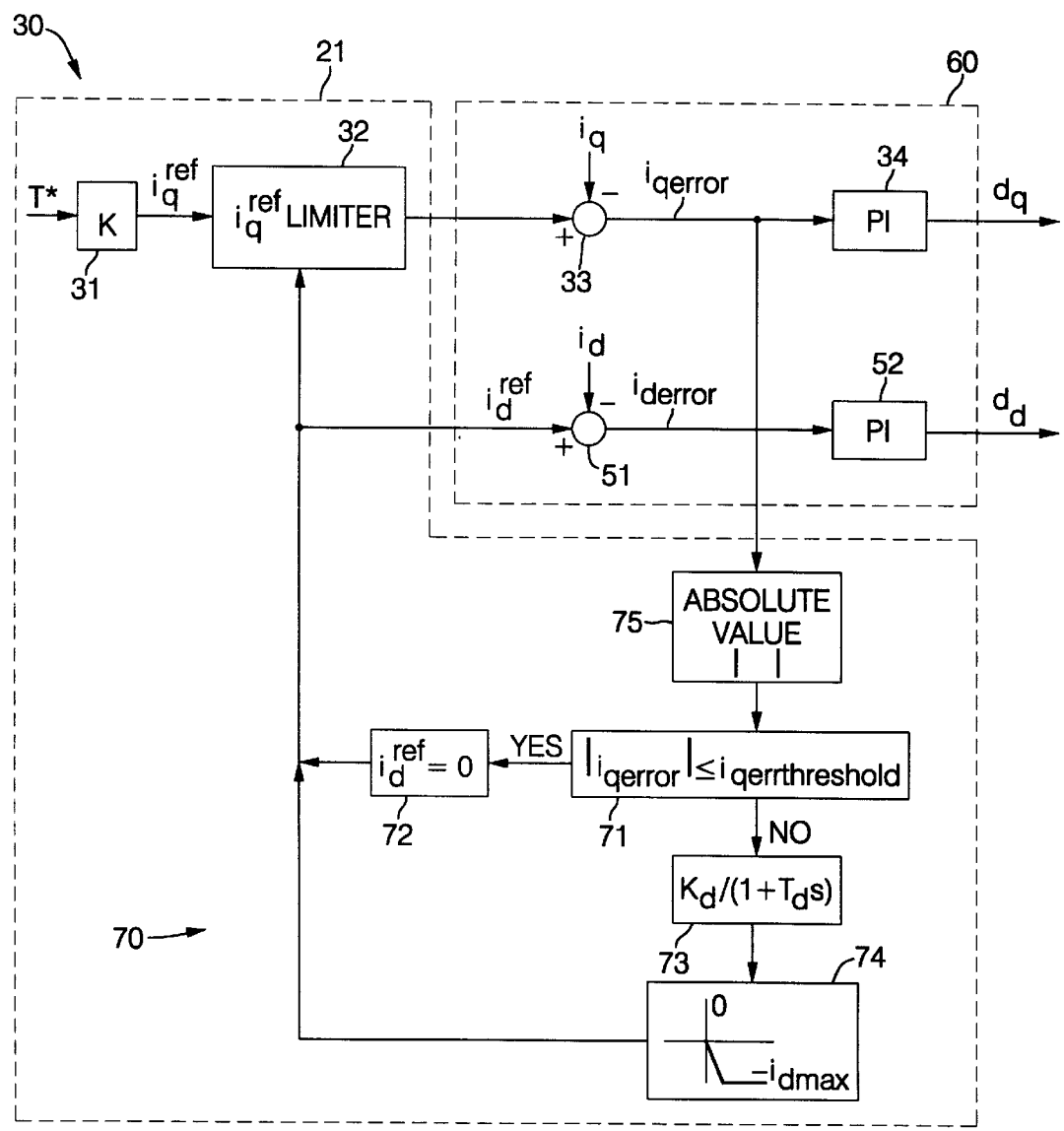
FIG. 2 illustrates details of the exemplary control system and method.

Details of the present invention are shown in FIG. 2, which provides a depiction of the control system 20 and control method 30. In FIG. 2, blocks 31, 32 and 71–74 are elements of the flux weakening circuit 21 in FIG. 1. Blocks 33, 34, 51 and 52 are components of a current regulating loop 60.

The control system 20 method 30 takes the torque command ($T^{ref}$) as an input. In surface-mounted synchronous permanent magnet machines 10, the torque produced by the motor, is related to the q-axis current ($i_q$) of the motor 11 as:

$$T = 1.5 P \psi_f i^q, \quad [A]$$

where P is the number of machine pole pairs, $\psi_f$ is the flux of permanent magnets mounted on the rotor. Therefore, for a given torque reference, the corresponding q-axis current reference ($i_q^{ref}$) is, according to equation [A], expressed as:

$$i_q^{ref} = K T^{ref}, \quad [B]$$

The maximum achievable q-axis current (i.e. maximum torque) is determined by physical (voltage and current) machine limitations:

$$v_d^2 + v_q^2 \leq V_{max}^2 \quad [C]$$
$$i_d^2 + i_q^2 \leq I_{max}^2 \quad [D]$$

where $V_{max}$ and $I_{max}$ are maximum (per phase) voltage and current respectively.

In the block-diagram of FIG. 2, the current limitation [D] is shown as an $i_q^{ref}$ limiter 32. The d-axis current reference signal ($i_d^{ref}$) is generated in the flux weakening loop 70, comprising blocks 71–74 in FIG. 2. The current reference signals ($i_d^{ref}$, $i_q^{ref}$) are compared with d and q components of the machine current ($i_d$, $i_q$) in summing devices 33, 51 which output respective error signals. The error signals comprise inputs for current compensation, comprising blocks 34 and 52. Current compensation (blocks 34, 52) is realized by proportional-integral (PI) regulators 23, but other current compensation implementations may be used.

The q-axis current error signal ($i_{qerr}$) is input to the flux weakening loop 70, and its absolute value is generated 75. The on-set point for this mode of operation is determined by a preset threshold value of q-axis current error ($i_{qerrthreshold}$). The test of this condition is performed in a comparison block 71. As long as the absolute value of the error ($|i_{qerr}|$) is below the preset threshold value, the d-axis current reference ($i_d^{ref}$) is kept at zero, set by block 72.

A significant increase in the q-axis current error indicates the need for flux weakening operation, i.e. for injection of an appropriate d-axis current component so that back EMF reflected at stator windings is kept at a value which gives maximum feasible voltage margin for the q-axis current production at the given speed. Block 73 assures that unwanted d-axis current is not injected due to small errors in q-axis current during transients below base speed. For operation in the flux weakening region, some small steady state error in q-axis current is inevitable. However, the appropriate choice of the constant $K_d$ in block 73 minimizes the error. To prevent unnecessary deep demagnetization of the rotor permanent magnets, a limiter 74 is included in the flux weakening loop 70.

The present system 20 and method 30 provides for an automatic transition to the flux weakening mode (operation above base speed), regardless of DC bus voltage, load or other operating conditions. This feature provides significant performance improvement. No look-up tables are used in the flux weakening loop 70. The on-set point for flux weakening is automatically adjusted, and may be changed through software, and is a new feature provided by the present invention that improves the performance of the system. An appropriate d-axis current component is injected over the entire speed range, providing the maximum available torque (which corresponds to the q-axis current component).

The present invention has been fully simulated and has also been implemented in an electrical drive system to test out the operability thereof.

Thus, a system and method for controlling a surface-mounted permanent magnet synchronous machine drive over a wide speed range using q-axis current error have been disclosed. It is to be understood that the above-described embodiments are merely illustrative of one of the many specific embodiments that represent applications of the principles of the present invention. Clearly, numerous and other arrangements can be readily devised by those skilled in the art without departing from the scope of the invention.

What is claimed is:

1. A surface-mounted permanent magnet synchronous machine drive comprising:

a motor;

a voltage source inverter coupled between a battery and the motor that drives the motor;

a control system coupled to the inverter for controlling the inverter and the motor comprising:

a first coordinate transformation circuit for processing drive signals applied to the motor and rotor position signal ($\theta_r$) to generate motor current signals ($i_d$, $i_q$);

a flux weakening circuit for processing torque command ($T^{ref}$), and torque producing current error signal ($i_{qerr}$) to generate d-axis and q-axis reference current signals ($i_d^{ref}$, $i_q^{ref}$) in response to q-axis current error signal;

a current regulating loop for processing the reference current signals ($i_d^{ref}$, $i_q^{ref}$) and the motor current signals ($i_d$, $i_q$) to generate d-axis and q-axis modulation index signals ($d_d$, $d_q$);

a second coordinate transformation circuit for transforming the d-axis and q-axis modulation index signals ($d_d$, $d_q$) into modulation index signals in the stationary coordinate frame ($d_\alpha$, $d_\beta$); and a space vector modulator for modulating the modulation index signals in the stationary coordinate frame ($d_\alpha$, $d_\beta$) to produce outputs that drive the voltage source inverter 12.

2. The machine drive recited in claim 1 wherein the flux weakening circuit comprises:

a limiter for limiting the q-axis current reference signals ($i_q^{ref}$);

a q-axis adder for comparing the q-axis current reference signals ($i_q^{ref}$) with the q-axis motor current signals ($i_q$) to produce q-axis current error signal;

a q-axis compensation circuit for regulating the q-axis current error signals to generate q-axis modulation index signals ($d_q$);

a flux weakening loop for comparing the q-axis current error signals to a preset threshold value, for setting the d-axis current reference ($i_d^{ref}$) equal to zero if the q-axis current error signals are below the preset threshold value, and for setting 73 the d-axis current reference ($i_d^{ref}$) to a value that provides a voltage margin for production of q-axis current at a given motor speed if the q-axis current error signals are equal to or greater the preset threshold value;

a d-axis adder for comparing the d-axis current reference ($i_d^{ref}$) with the d-axis motor current signals ($i_d$) to produce d-axis current error signals; and a d-axis compensation circuit for regulating the d-axis current error signals to generate d-axis modulation index signals ($d_d$).

3. The machine drive recited in claim 1 wherein the flux weakening loop further comprises a limiter for limiting the d-axis current reference ($i_q^{ref}$) when the q-axis current error signals are equal to or greater the preset threshold value to prevent deep demagnetization of permanent magnets in the motor.

4. The machine drive recited in claim 1 wherein the q-axis and d-axis compensation circuits comprise proportional-integral regulators.

5. The machine drive recited in claim 1 wherein the current regulating loop 60 comprises q-axis and d-axis adders coupled to q-axis and d-axis regulators 23.

6. A method of controlling a machine drive having a voltage source inverter coupled between a battery and a motor that drives the motor, comprising the steps of:

supplying a torque command comprising a q-axis current reference signal ($i_q^{ref}$);

limiting the q-axis current reference signal ($i_q^{ref}$);

comparing the q-axis current reference signal ($i_q^{ref}$) with the q-axis motor current signal ($i_q$) to produce a q-axis current error signal;

regulating the q-axis current error signal to generate a q-axis modulation index signal ($d_q$);

comparing the q-axis current error signal to a preset threshold value;

if the q-axis current error signal is below the preset threshold value, setting the d-axis current reference ($i_d^{ref}$) equal to zero;

if the q-axis current error signal is equal to or greater the preset threshold value, setting the d-axis current reference ($i_d^{ref}$) to a value that provides a voltage margin for production of q-axis current at a given motor speed;

comparing the d-axis current reference ($i_d^{ref}$) with the d-axis motor current signal ($i_d$) to produce a d-axis current error signal; and regulating the d-axis current error signal to generate a d-axis modulation index signal ($d_d$).

7. The method recited in claim 6 further comprising the step of limiting the d-axis current reference ($i_d^{ref}$) when the q-axis current error signal is equal to or greater the preset threshold value to prevent deep demagnetization of permanent magnets in the motor.

8. The method recited in claim 6 wherein regulation is realized by proportional-integral regulators 23.

9. A method of controlling a permanent magnet synchronous motor, comprising the steps of:

determining a torque producing current command;

comparing the torque producing current command to measured torque producing current to determine an error signal;

controlling torque producing current to the motor in response to the error signal in response to the error signal, determining a flux weakening current command; and controlling flux weakening current to the motor in response to the flux weakening current command.

10. A method of controlling a permanent magnet machine according to claim 9, wherein the step of controlling flux weakening current to the motor comprises the substeps of:

comparing the flux weakening current command to measured flux weakening current to determine a second error signal;

controlling the motor in response to the second error signal.

11. A method of controlling a permanent magnet machine according to claim 9, also comprising the step of:

limiting the torque producing current command in response to the flux weakening current command.

12. A method of controlling a permanent magnet machine according to claim 11, wherein the torque producing current command is limited so that the sum of the torque producing current command and the flux producing current command do not exceed a maximum current for the motor.

13. A method of controlling a permanent magnet machine according to claim 9, wherein the flux weakening current command is set to zero unless the error signal is greater than a predetermined threshold.

14. A method of controlling a permanent magnet machine according to claim 9, wherein the flux weakening command prevents motor back emf from substantially reducing operating efficiency of the motor and increases maximum motor output torque.

* * * * *